United States Patent
Miura

[15] 3,687,292
[45] Aug. 29, 1972

[54] APPARATUS FOR THE REMOVAL OF FILTER CAKE BY LIQUID INJECTION

[72] Inventor: Mitsugi Miura, 13,2-chome, Tezukayama, Sumiyoshi-ken, Osaka, Japan

[22] Filed: Sept. 28, 1970

[21] Appl. No.: 76,094

[30] Foreign Application Priority Data

Oct. 1, 1969   Japan ..................44/78345

[52] U.S. Cl. .................................................210/225
[51] Int. Cl. .............................................B01d 25/32
[58] Field of Search....210/67, 79, 81, 106, 225, 391, 210/409

[56] References Cited

UNITED STATES PATENTS

| | | |
|---|---|---|
| 798,200 | 8/1905 | Merrill..........................210/81 |
| 2,737,300 | 3/1956 | Kracklauer..................210/106 |
| 1,226,104 | 5/1917 | Merrill..........................210/67 |
| 1,302,813 | 5/1919 | Kuryla..........................210/81 |
| 3,285,417 | 11/1966 | Schmidt et al..........210/409 X |
| 3,329,274 | 7/1967 | Landon....................210/409 X |

*Primary Examiner*—Reuben Friedman
*Assistant Examiner*—T. A. Granger
*Attorney*—George B. Oujevolk

[57] ABSTRACT

A method for the removal of filter cake wherein the injection slit is closed during the filtration cycle by the movable injection guide plates which press against the filter cloth, injection water is sprayed onto the cake after the filtration process has been completed by opening the injection slit which extends the width of the cloth by the pressure of the high pressure injection water, and the angle between the injection guide plate and the filter cloth is changed in order to cause the injection water to collide with every part of filter cake.

3 Claims, 6 Drawing Figures

PATENTED AUG 29 1972 3,687,292

PRIOR ART

Mitsugi Miura
INVENTOR

BY George B Oujevolk
ATTORNEY

PATENTED AUG 29 1972 3,687,292

INVENTOR

Mitsugi Miura

BY George B Oujevolk

ATTORNEY

APPARATUS FOR THE REMOVAL OF FILTER CAKE BY LIQUID INJECTION

This invention relates to an apparatus for the removal of filter cake accumulated on the filter medium.

Hitherto, the removal of filter cake accumulated on the filter medium during the filtering of a liquid such as water has widely been carried out by back-washing or by jetting water or other similar methods. In order to remove filter cake efficiently by nozzle injection, it is essential that the high pressure, high velocity water jets be made to contact every part of the filter cake. In order to increase the pressure of water jets, a pump or the like may be used to apply pressure. In order to jet water over every part of the filter medium, a complicated method must be used in which the injection nozzle is moved or the filter medium is rotated.

The main object of this invention is to provide an apparatus for easily and effectively removing filter cake accumulated on a filter medium.

Other objects of this invention will be apparent from further details described hereinafter with reference to the accompanying drawings.

Figure 3:
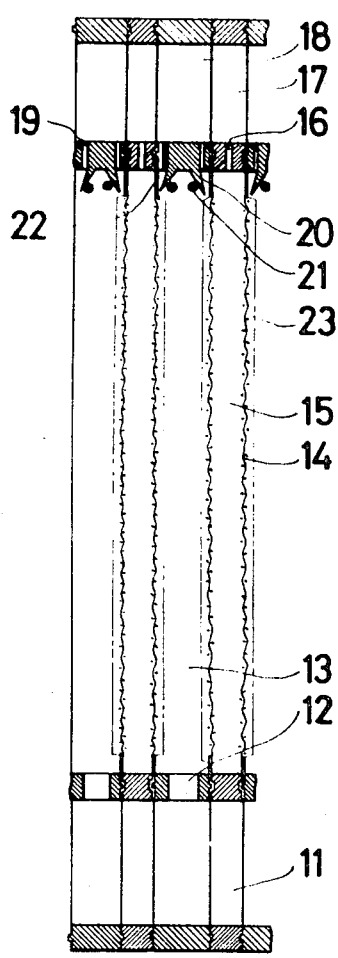
FIG. 3 is a sectional view of an apparatus for the removal of filter cake by liquid injection according to this invention.
Figure 4:
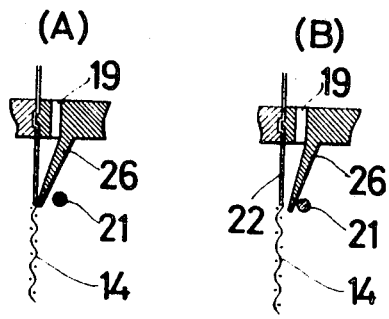

FIG. 4 (A) and (B) are enlarged views illustrating the open and closed states of the movable injecting guide plate in the apparatus shown in FIG. 3.

Figure 5:
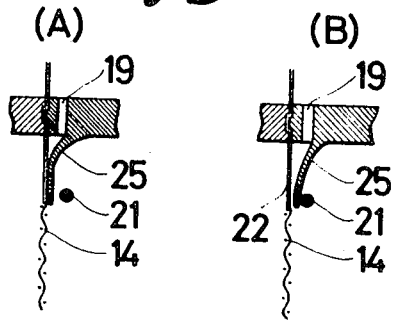

FIG. 5 is an enlarged view of another embodiment of the movable injection guide plate.

Figure 6:
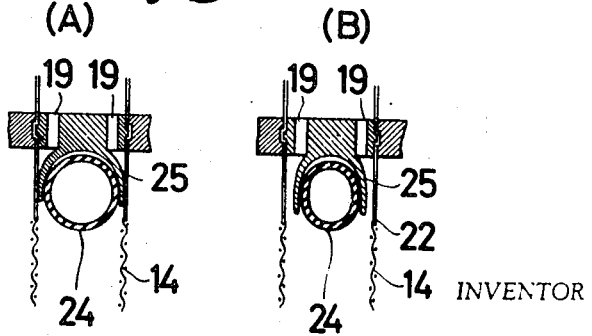

FIG. 6 is an enlarged view of still another embodiment of the movable injecting guide plate.

Figure 1:
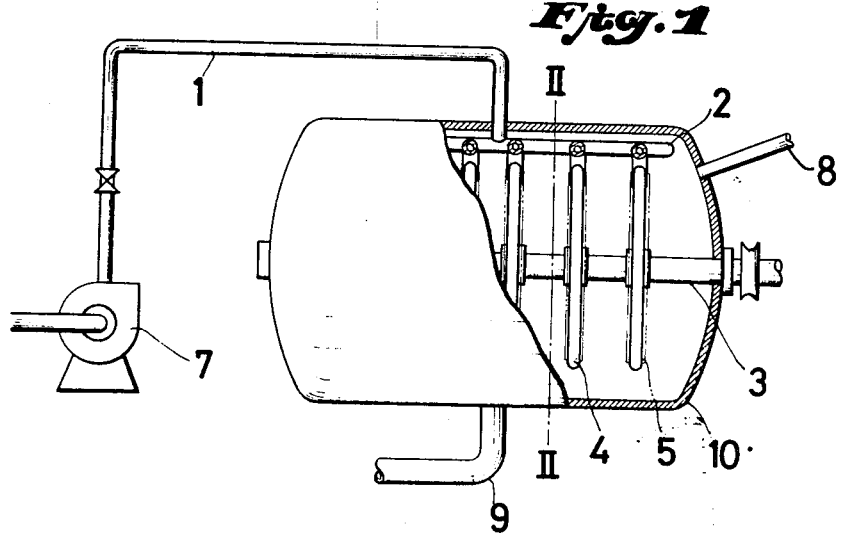
FIG. 1 is a front view, partly in section, of the conventional apparatus of a filter for the removal of filter cake by liquid injection.
Figure 2:
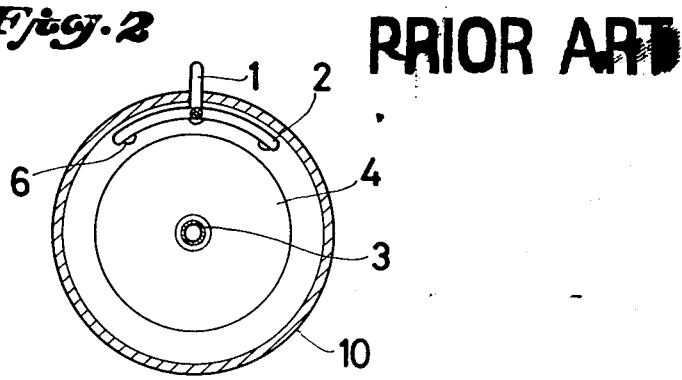
FIG. 2 is a side sectional view along line II — II of FIG. 1.

In FIGS. 1 and 2 is shown a conventional apparatus 10 for the removal of filter cake 5 by liquid injection. In the drawings, liquid to be filtered is supplied from inlet 8 under pressure. The supplied liquid is filtered by filter leaf 4 and then recovered from holes provided in shaft 3. At the same time, there remains filter cake 5 on filter leaf 4. When filter cake 5 accumulates up to a fixed amount on filter leaf 4, liquid to which pressure is applied by pump 7 is jetted through pipe 1 from nozzles 6 provided in pipe 2 of apparatus 10 so as to wash and remove filter cake 5. Filter leaf 4 is rotated by shaft 3 to wash the whole of the filter leaf. The filter cake so washed is expelled from the apparatus via pipe 9.

FIG. 3 shows raw liquid passages 11, raw liquid inlets 12 to filter chambers 13, filter cloths 14, filtrate chambers 15, outlets 16 from filtrate chambers 15 discharging into filtrate passages 17, injection water passages 18 connected via the injection water outlets 19 to filter chambers 15, injection water guides 20 at the end of the filter cloth extending across the width thereof and being supported by supports 21, narrow injection slits 22 formed between the guide plate and the filter cloth and stretching the width of the filter cloth, and layer of filter cake 23.

FIG. 4 (A) shows the movable guide plate 26 sticking to the filter cloth 14 or the filter cloth support and effectively closing the injection slit. (The edges of the filter cloth are sometimes bonded to the filter plate with rubber in order to form an airtight seal. Hereinafter both the filter cloth and filter plate are referred to as "filter cloth").

FIG. 4 (B) shows the movable guide 26 in the open position i.e. separated from the filter cloth.

When raw liquid is fed into the chambers 13 either with or without prior precoating of the filter cloths with filter aids such as diatomite, a filter cake layer 23 forms on the surface of the filter cloth 14.

After the filtration cycle has ended, the raw liquid remaining in the filter chamber 13 is discharged. The filter cake layers are then washed from the filter cloths by the action of the injection water sprays issuing from the injection slits over the width of the filter cloth. When all the filter cake has been removed, the filtration process begins again.

In this invention, due to the fact that the injection slits extend the whole width of the filter cloth and because the water issuing from the narrow slits (1.0 or 1.5 mm) impinges with high velocities over every part of the filter cloth, the whole of the filter cake is effectively removed.

This invention has the advantage over conventional methods in that it avoids the use of complicated mechanisms.

In FIG. 3, the injection guide plates are shown at an angle to the filter cloth. Alternatively they may be mounted parallel to the filter cloth. Further, they may be eliminated altogether and the injection water outlet passages be used instead of injection slits. Any shape of injection slit may be used provided that it is narrow and extends the width of the cloth.

If the injection slit is open during filtration, raw water can enter the injection passages and may block them by deposition of solid material which would prevent further operation.

FIG. 4 indicates that the guide plates are made of flexible material such as rubber, plastic or thin metals. The guide plates are pressed on to the filter cloth by the pressure of the raw liquid during the filtration cycle thus preventing the entry of raw liquid into the injection water passages as shown in FIG. 4 (A). In FIG. 4 (B) the guide plates are shown open during the filter cloth cleaning cycle. The pressure of the injection water opens the slits and then washes the filter cake from the filter cloths.

The guide plate supports 21 do not allow the injection slits to open too far. In this case, if flexible matter such as rubber is used as the material of a movable guide plate, then as shown in FIG. 5 (A), the guide plate is bent, sticks to the filter cloth more closely and prevents water containing solid particles from flowing into the injection chamber during the filtration cycle. FIG. 5 (B) indicates that during the washing cycle the movable guide plate vibrates over a narrow range owing to the changes in speed and pressure of the injection water from the slit and the angle formed between the guide plate and the filter cloth varies to a small extent, which causes the direction and speed of injection water to change a little. For this reason, injection water is made to collide with every part of filter cake and consequently leads to the effective removing of filter cake.

Other means of making contact between injection guide plates and filter cloths may be freely used instead of relying on raw water pressure alone, FIGS. 6 (A) and 6 (B) indicates such a method. Contact is made between the guide plates and filter cloth by inflating a rubber tube 24 using compressed air or water under pressure. The gap is thus effectively sealed for the filtration cycle. When the filter cake is to be removed, the gap between the guide plate and cloth is opened by reducing the pressure of the fluid, so forming an injection slit. The degree of opening of the slits varies as the pressure of the fluid in the rubber tube and this give control over cake removal. As stated previously the washing and removal of filter cake is carried out in 10 to 20 seconds by this technique and so the filtration operation is easier and the capital cost less than with conventional cake washing and removal equipment.

In the drawing the injection slit openings extend the width of the filter cloth and are without intervals. For broader filter cloth, however, a plurality of slits may be used at short intervals to maintain the strength thereof, to easily perform the manufacture thereof or to increase injection velocity, as long as it is possible to wash and remove filter cake sticking to the whole length of the filter cloth. In this illustration, a vertical filter with a rectangular filter cloth is used. This invention may also be applied to horizontal filters or circular filter cloths.

In conventional methods, in backwashing cycle, the filter cloth is bent by the pressure on the surface. Many ribs are provided at a small distance so that the filter cloth is not so bent. Therefore, when backwashing is carried, solid material in the water is apt to clog between the ribs.

With this invention however, backwashing is avoided and there are no ribs where clogging may occur.

What is claimed is:

1. A filter apparatus to filter liquid comprising in combination:
   a. at least first, second and third parallel longitudinal chambers said second chamber being a middle chamber, said first and third chambers being on both sides of said second chamber, inlet means at one end of said second chambers defining the input side of the chamber and outlets at the ends of said first and third chambers opposite said input side;
   b. a filter material wall extending between said first and second as well as said second and third chamber so that liquid entering said second chamber inlet means has to pass through said filter to exit through said first and third chamber outlets;
   c. second inlet means into said second chamber but on the end opposite said defined input side for passing wash liquid into said chamber including an injection water passage and narrow injection outlets directing wash liquid onto the filter material wall; and
   d. tapered, extended guide means extending from said second inlet means next to said injection outlets said guide means extending towards said filter material and further extending across the entire width of said filter material to apply water pressure against cake layer clogging said filter to wash it off.

2. An apparatus as claimed in claim 1, said guide means having an inner wall which curves in the direction of said filter material.

3. An apparatus as claimed in claim 1, said guide means including a tip which is moveable to and away from said filter material so as to direct wash fluid to parts along the entire length of the filter material.

* * * * *